United States Patent [19]
Swanson

[11] Patent Number: 5,904,904
[45] Date of Patent: May 18, 1999

[54] TREATMENT OF CONTAMINATED PARTICULATE MATERIAL BY LOW-TEMPERATURE THERMAL DESORPTION WITH INDIRECT HEATING

[75] Inventor: Malcolm Leland Swanson, Chickamauga, Ga.

[73] Assignee: Astec Industries, Inc., Chattanooga, Tenn.

[21] Appl. No.: 08/741,923

[22] Filed: Oct. 31, 1996

[51] Int. Cl.$^6$ .................................................. B01D 50/00
[52] U.S. Cl. ........................ 422/182; 432/114; 432/111; 432/109
[58] Field of Search ............................ 422/182; 432/112, 432/113, 114, 117, 107, 108, 111, 109

[56] References Cited

U.S. PATENT DOCUMENTS

| | | | |
|---|---|---|---|
| 4,941,822 | 7/1990 | Evans et al. | 432/112 |
| 5,129,334 | 7/1992 | Mize | 110/246 |
| 5,176,087 | 1/1993 | Noland et al. | 110/346 |
| 5,176,445 | 1/1993 | Mize | 366/7 |
| 5,203,693 | 4/1993 | Swanson | 432/110 |
| 5,230,167 | 7/1993 | Lahoda et al. | 34/75 |
| 5,273,355 | 12/1993 | May et al. | 366/23 |
| 5,302,118 | 4/1994 | Renegar et al. | 432/14 |
| 5,361,514 | 11/1994 | Lahoda et al. | 34/391 |
| 5,378,059 | 1/1995 | Brock | 366/7 |
| 5,378,083 | 1/1995 | Swanson | 405/128 |
| 5,382,002 | 1/1995 | Evans et al. | 266/205 |
| 5,393,501 | 2/1995 | Clawson et al. | 422/187 |
| 5,466,418 | 11/1995 | Swanson et al. | 422/111 |

OTHER PUBLICATIONS

"Soil Purification" by Wendell R. Feltman, P.E., Soil Purification Inc.; Technical Paper T-125.

Primary Examiner—Edward J. Cain
Attorney, Agent, or Firm—Chambliss, Bahner & Stophel, P.C.

[57] ABSTRACT

Contaminants are removed from particulate material in an inclined, rotating drum which has an inlet for contaminated material at its upper end, an outlet at its upper end for vaporized contaminants, an inlet for air that is located between the upper end and the lower end, and an outlet for clean particulate material at its lower end. Contaminated particulate material is admitted to the upper end of the drum and conveyed under the influence of gravity and the rotation of the drum to its lower end. A combustion chamber at the lower end of the drum is provided with an air inlet, a fuel burner and an outlet for combustion products. Fuel is burned in the combustion chamber with excess air supplied so that the temperature of the products of combustion is high enough to volatilize the contaminants in the particulate material, but not so high as to incinerate them. A fire tube within the drum conveys the combustion products from the combustion chamber to the upper end of the drum. Heat is transferred from the products of combustion in the fire tube to the particulate material in the drum by radiation as the products of combustion are conveyed through the fire tube. Heated air introduced into the drum through the air inlet contacts the particulate material and also heats it by conduction and convection as it is conveyed under the influence of gravity and the rotation of the drum to the lower end. The heated air entrains the vaporized contaminants and conducts them to the outlet at the upper end of the drum. Clean particulate material is discharged from the drum at its lower end, and vaporized contaminants entrained in air are removed from the drum at its upper end. These vaporized contaminants are conveyed to a second stage treatment unit, where they are removed from the entraining air.

24 Claims, 3 Drawing Sheets

TREATMENT OF CONTAMINATED PARTICULATE MATERIAL BY LOW-TEMPERATURE THERMAL DESORPTION WITH INDIRECT HEATING

FIELD OF THE INVENTION

The invention relates to the remediation of contaminated particulate material such as soil that has been contaminated with petroleum products. More particularly, the invention relates to a method and apparatus for treating such material to remove the contaminants therefrom by a low temperature thermal desorption process that is carried out without direct contact between the contaminated particulate material and any flame or products of combustion from the heat source that is used in the process.

BACKGROUND OF THE INVENTION

Soil, sand, aggregate and other particulate material may readily be contaminated with petroleum products and other combustible and/or hazardous materials. Such contamination has been unfortunately all too common at mining and industrial sites and petroleum storage and sales facilities. Consequently, many such sites are contaminated with waste oil, fuel oil and a variety of other combustible and otherwise hazardous materials. Governmental regulations relating to the storage of such materials and to the clean-up of such sites have led to a requirement for the remediation of thousands of tons of soils and other particulate materials from such sites or that are otherwise contaminated with such materials. The two most commonly used methods for remediating or treating contaminated soils and other particulate materials to remove such contaminants are high-temperature incineration and low-temperature thermal desorption.

High-temperature incineration is a process by which the soils or other particulate materials to be treated are heated to a temperature high enough to oxidize or incinerate the contaminants therein. This process is generally capable of treating highly contaminated materials in order to remove the contaminants therefrom; however, it does have several disadvantages. High-temperature incineration requires the consumption of large quantities of fuel and the provision of equipment that is capable of withstanding the high temperatures at which it is carried out. Thus, high-temperature incineration is relatively expensive. Furthermore, it alters the molecular structure of many of the constituents in the material being treated, thus forming a concentrated ash that must be disposed of. In addition, when used to treat soil, high-temperature incineration generally destroys all organic materials therein, not just the undesirable ones, and may render the soil unsuitable for sustaining plant life. This may require that the treated soil be removed from the site to a landfill, instead of being reusable on site. High temperature incineration processes are described in U.S. Pat. No. 4,941,822 of Evans et al. and in U.S. Pat. No. 5,273,355 of May et al.

Low-temperature thermal desorption does not alter the molecular structure of the particulate material treated thereby. Instead, it usually involves a two-step process in which the material is first heated to a temperature sufficient to vaporize the contaminants but lower than that required for incineration thereof. Then, in the second step of the process, the vaporized contaminants are oxidized in a separate high-temperature afterburner. Low-temperature thermal desorption is often preferred to high-temperature incineration for a number of reasons. The first step in the low-temperature thermal desorption process, in which the soil is heated, is carried out at a temperature considerably lower than that required for incineration. In addition, the second step in the low-temperature thermal desorption process, in which the evaporated contaminants are incinerated, requires much less energy than does the incineration of the soil in a high-temperature process. Therefore, the low-temperature thermal desorption process requires much less fuel than does the high-temperature incineration process. In addition, the capital cost for the thermal desorption system is generally less than that of the high-temperature incineration system. The expense in providing equipment that can be operated at the temperatures required for high-temperature incineration is considerable, and because the high-temperature step of the thermal desorption process is carried out in a much smaller incineration chamber than would be required for incineration of all of the soil to be treated, it requires much less of such expensive equipment. In addition, because the high-temperature incineration process frequently renders the treated soil unsuitable for sustaining plant life, the treated soil may have to be trucked offsite to a landfill, thereby greatly increasing the cost of handling it. Low-temperature thermal desorption processes are described in U.S. Pat. No. 5,176,445 of Mize, U.S. Pat. No. 5,382,002 of Evans et al. and U.S. Pat. No. 5,393,501 of Clawson et al.

However, low-temperature thermal desorption processes may also have limitations that restrict their use. Vaporized petroleum and similar contaminants are highly combustible. Therefore, great care must be taken when combustible contaminants are conveyed from a first-stage vaporization chamber to a high-temperature combustion chamber for oxidation. In order to reduce the risk of explosion when such contaminants are removed by vaporization in the first stage of a thermal desorption system, their concentrations must be maintained at levels well below their lower explosive limits. Contaminant concentrations above this limit could cause explosions in the ductwork leading to the afterburner. Thus, thermal desorption systems have generally been considered unsuitable for the treatment of highly contaminated particulate material.

However, modified low-temperature thermal desorption systems have also been developed for the treatment of highly contaminated materials. Thus for example, U.S. Pat. No. 5,176,087 of Noland et al., U.S. Pat. No. 5,230,167 of Lahoda et al., U.S. Pat. No. 5,361,514 of Lahoda et al. and U.S. Pat. No. 5,466,418 of Swanson et al. all describe systems of such type.

All high temperature incineration and low-temperature thermal desorption treatment methods involve the application of heat to the contaminated material, and most such methods require that there be direct contact between the contaminated material and a heat source flame and/or its products of combustion. Where such direct contact occurs, extensive air pollution restrictions generally apply, and permitting for such a direct-contact system may be expensive and time-consuming. Furthermore, the necessary treatment of the contaminated hot gases resulting from such direct contact may be difficult and expensive.

Therefore, it would be desirable if a method and apparatus could be developed for treating contaminated particulate material without exposing the contaminated material to direct contact with the flame and/or products of combustion from a heat source. However, of the conventional and known processes referred to above, only U.S. Pat. No. 4,941,822 of Evans et al. describes a process that does not provide for such direct contact.

The '822 patent of Evans et al. describes an apparatus for incinerating the contaminants in contaminated particulate material, such as foundry sand. According to the Evans process, the sand is fed into an inclined rotating drum which is externally heated to a temperature within the range of 1200°–1600° F. by a plurality of fuel burners mounted within openings in a housing around the drum. Air is supplied to the drum in a quantity in excess of that required to completely burn the organic materials from the sand and calcine the mineral contaminants. However, such method employs an inherently inefficient means of heating the sand in the drum.

It would be desirable therefore, if a more efficient method and apparatus could be developed that could be utilized to treat contaminated materials while avoiding any direct contact between the contaminated material and the flame and/or products of combustion from the heat source. It would also be desirable if a low-temperature thermal desorption method could be developed that could be used to treat a variety of types of contaminated particulate materials, including soils that have been contaminated with petroleum products, without there being any direct contact between the contaminated materials and the flame and/or products of combustion from the heat source.

OBJECTS AND ADVANTAGES OF THE INVENTION

Accordingly, it is an object of the invention described and claimed herein to provide a low-temperature thermal desorption system for removal of contaminants from soils and other particulate materials without direct contact between the contaminated material and the flame and/or products of combustion from the system heat source. Furthermore, it is another object of the invention to provide such a method and apparatus that is relatively simple to construct and maintain, and that is economical to operate. It is still another object of the invention to provide such a method and apparatus that may be utilized to treat or remediate materials that are contaminated to varying degrees.

Additional objects and advantages of this invention will become apparent from an examination of the drawings and the ensuing description.

SUMMARY OF THE INVENTION

Accordingly, a method and apparatus for treating contaminated particulate material to remove the contaminants therefrom is described and claimed herein. This method includes providing a generally cylindrical, hollow, inclined drum having an upper end and a lower end, which drum is adapted to be rotated about its axis. The drum has an inlet for contaminated particulate material at its upper end, an outlet at its upper end for vaporized contaminants from the particulate material which are entrained in air, an inlet for air that is located between the upper end and the lower end, and an outlet for clean particulate material at its lower end. The method also includes providing a generally cylindrical fire tube within the drum, said fire tube having an axis that is generally parallel to the axis of the drum. The fire tube also has an upper end, a lower end, an inlet for combustion products at its lower end, and an outlet for combustion products at its upper end. The method also includes providing a combustion chamber that is located at the lower end of the drum, said combustion chamber having an air inlet, a fuel burner and an outlet for combustion products, which outlet is in fluid communication with the fire tube inlet. Furthermore, the method also includes providing a second stage treatment unit that is in fluid communication with the outlet at the upper end of the drum, which second stage unit is adapted to remove vaporized contaminants from a stream of entraining air. The method also includes admitting fuel and ambient air to the combustion chamber in such quantities that fuel may be burned therein with an excess of air so as to cool the products of combustion produced thereby to a first temperature that is sufficient to volatilize the contaminants in the particulate material without incineration thereof, while rotating the drum about its axis as contaminated particulate material is admitted to the drum at the upper end thereof, and conducting the products of combustion from the combustion chamber through the fire tube, so that heat is transferred from the tube to the particulate material in the drum by radiation, and so that the temperature of the combustion products at the outlet from the fire tube will be at a second temperature that is lower than the first temperature. The method also includes introducing heated air to the air inlet of the drum so that said heated air may contact the particulate material in the drum as it is conveyed under the influence of gravity and the rotation of the drum to the lower end thereof.

This heated air contributes to heating of the particulate material in the drum by conduction and convection, so that the contaminants in the particulate material are vaporized but not incinerated by the radiation from the fire tube and the conduction and convection from the heated air. Furthermore, such air entrains the vaporized contaminants and conducts them to the outlet at the upper end of the drum. The method further includes discharging clean particulate material from the drum at the lower end thereof, and removing vaporized contaminants entrained in air from the drum at the outlet at the upper end thereof and conveying them to the second stage treatment unit, where such contaminants are removed from the entraining air.

In order to facilitate an understanding of the invention, the preferred embodiment of the invention is illustrated in the drawings, and a detailed description thereof follows. It is not intended, however, that the invention be limited to the particular embodiment described or to use in connection with the apparatus illustrated herein. Various modifications and alternative embodiments such as would ordinarily occur to one skilled in the art to which the invention relates are also contemplated and included within the scope of the invention described herein.

BRIEF DESCRIPTION OF THE DRAWINGS

A preferred embodiment of the invention is illustrated in the accompanying drawings, in which like reference numerals represent like parts throughout, and in which.

DESCRIPTION OF THE PREFERRED EMBODIMENT OF THE INVENTION

Figure 1:
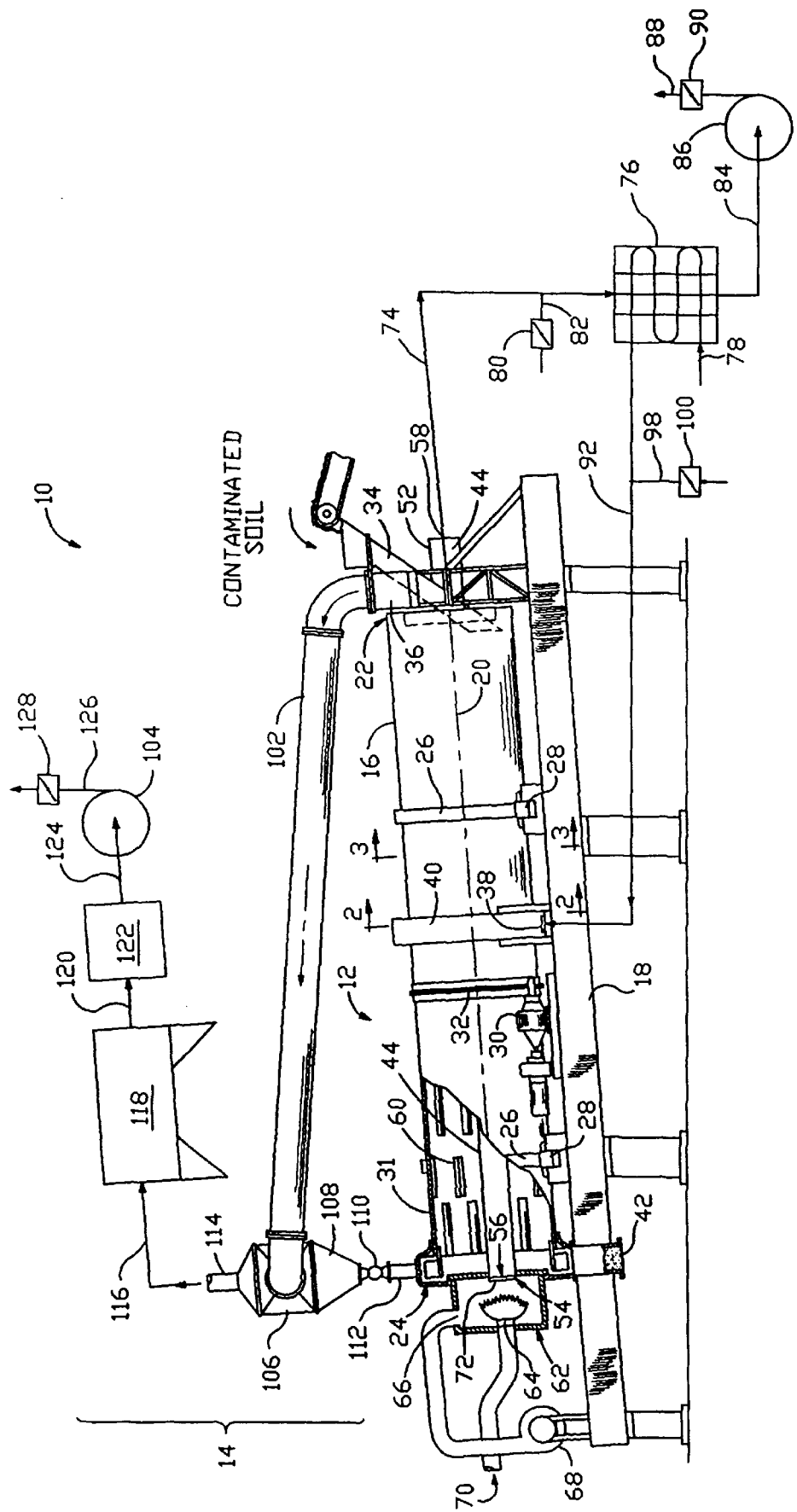
FIG. 1 is a side elevation view, partially in section and partially in schematic, of a preferred embodiment of a low-temperature thermal desorption system that is constructed and operated in accordance with the principles of the invention.
Figure 3:
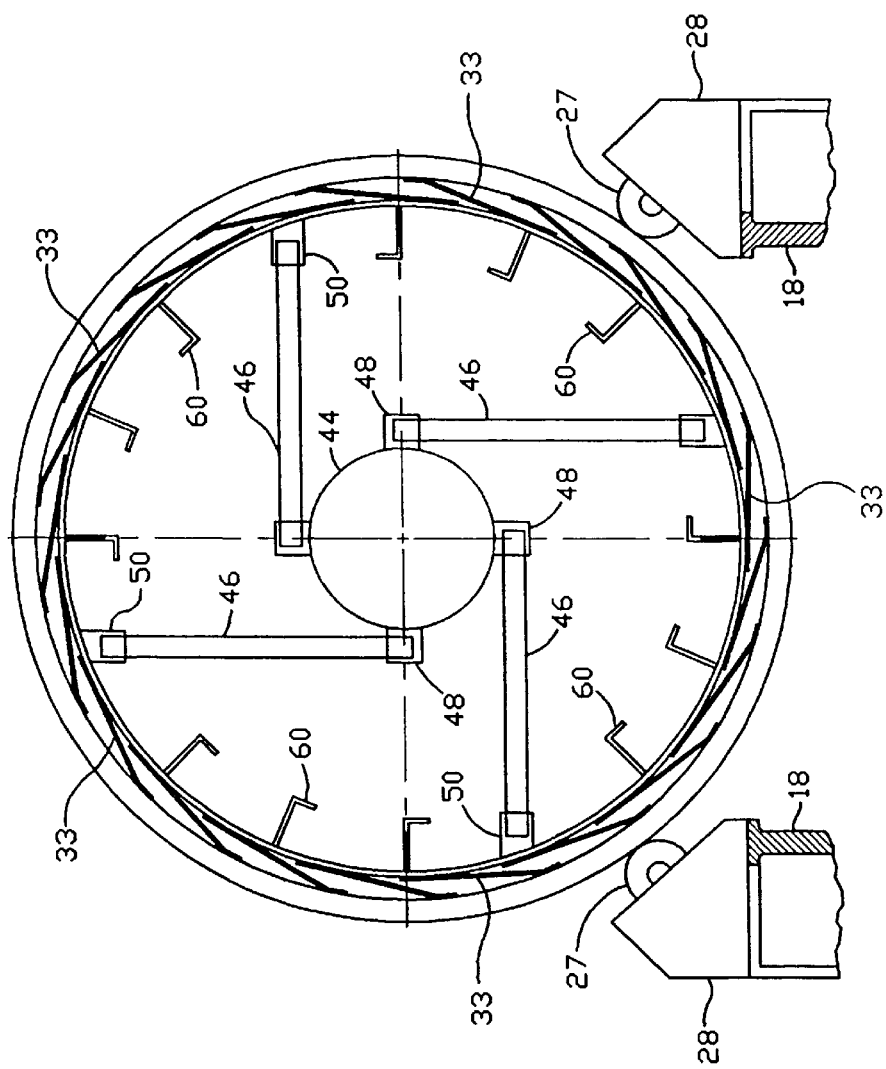
FIG. 3 is a sectional view of a portion of the apparatus of FIG. 1, taken along lines 3—3 of FIG. 1.

Referring now to the drawings, FIG. 1 illustrates a preferred embodiment of the invention, which may be utilized to treat contaminated particulate material, such as soil that has been contaminated by petroleum products, to remove the contaminants therefrom by a low-temperature thermal desorption method. As shown therein, treatment apparatus 10 includes first stage treatment unit 12 and second stage treatment unit 14. The first stage unit includes drum 16 which is generally cylindrical in shape and which is also hollow. Drum 16 is mounted on support frame 18 for rotation about axis 20, which is inclined with respect to the horizontal, so as to define an upper end 22 and a lower end 24. The drum is rotatably mounted on the support frame by means of drum tires 26, which are fixed in encircling relation to the exterior of the drum. Tires 26 are engaged by trunnions 27 (best shown in FIG. 3) of trunnion assemblies 28, as the drum is rotated. Rotation is provided in a conventional manner by motor 30, which is adapted to drive sprocket 32 (also fixed in encircling relation to the exterior of the drum) by means of a roller chain (not shown). Drum 16 typically has a diameter of about 1.5–3.0 meters (approximately 5–10 feet), and the major portion of its exterior surface may be covered by a layer 31 of glass fiber thermal insulation (shown in FIG. 1). The drum is preferably made from a low alloy steel, while the drum tires 26 are preferably hot-forged from solid billets of 1030 carbon steel. After quenching and hardening, the drum tires are machined to a high tolerance for smooth rolling engagement with trunnions 27. As shown in FIG. 3, the drum tires are supported by supports 33, which are preferably angled pieces of low alloy steel that are welded in place between the exterior of the drum 16 and the interior of the drum tires. By providing support for the drum tires in this fashion, thermal expansion of the drum may be accommodated without interfering with the close tolerance required for smooth rotation of the drum tires on trunnions 27.

Motor 30 may be of any convenient size, depending on the size and desired rate of rotation of the drum, but good results may be expected and a rotational rate provided between two and three rpm when the drum size is selected within the range described above and the motor is selected so as to provide power at a rate of from about 37 kW to about 93 kW (50–125 hp).

Drum 16 has an inlet 34 at its upper end 22 for contaminated particulate material, such as soil that has been contaminated with petroleum. This inlet permits contaminated material to be introduced into the interior of the drum while it is rotating about central axis 20. The drum also has an outlet 36 at its upper end for vaporized contaminants from the particulate material which are entrained in air, as will be subsequently explained. The drum also has an inlet 38 for air, preferably contained in non-rotating manifold 40, that is located between upper end 22 and lower end 24, and an outlet 42 for clean particulate material at its lower end.

Figure 2:
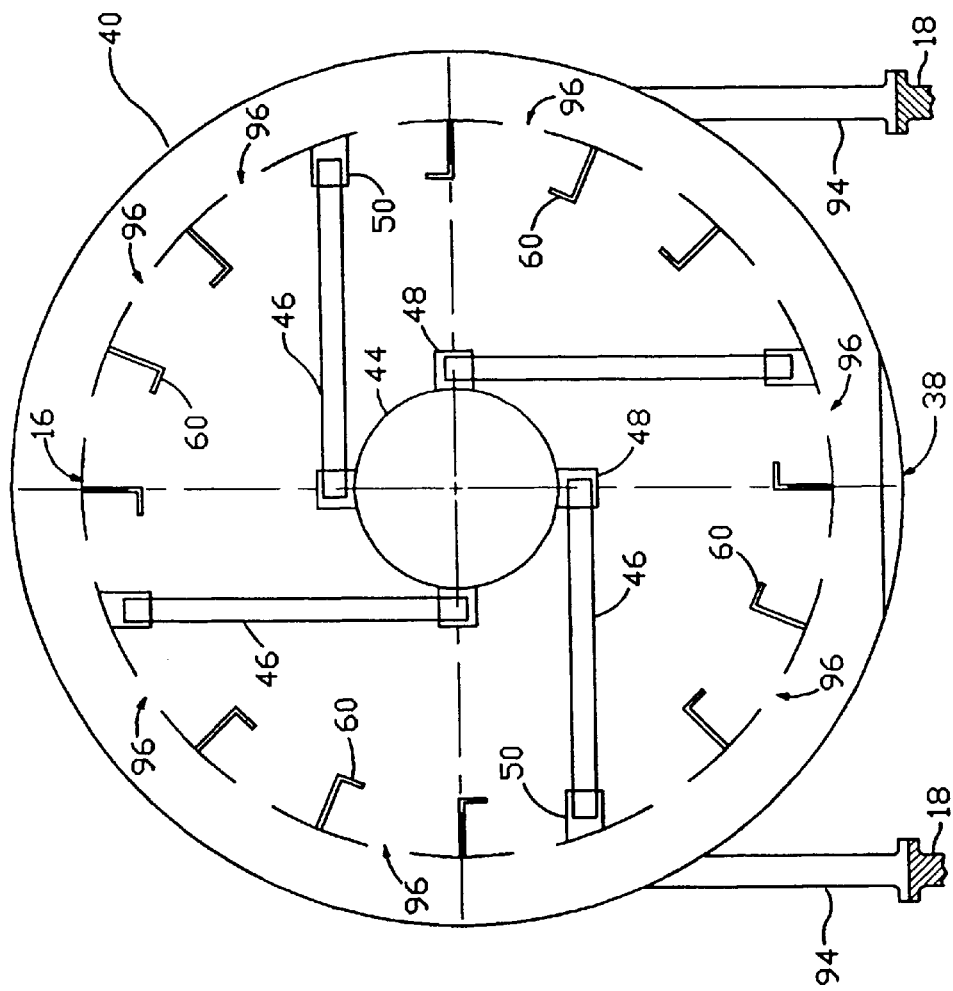
FIG. 2 is a sectional view of a portion of the apparatus of FIG. 1, taken along lines 2—2 of FIG. 1.

Apparatus 10 also includes a generally cylindrical fire tube 44 that is located within the drum, oriented along an axis that is generally parallel to, and preferably substantially coincident with axis 20 of the drum. Preferably, the fire tube is adapted to be rotated with the drum about the axis of the drum, or the common axis of the drum and fire tube. As shown in FIGS. 2 and 3, the fire tube is preferably supported within the drum by means of a plurality of stainless steel pipe supports 46, which are arranged about the fire tube and disposed in groups of four along the length thereof. Preferably, each of the pipe supports is slotted at each end so as to receive fire tube support bracket 48 and drum wall support bracket 50. In the preferred embodiment of the invention, these flat brackets are also made from stainless steel, and the pipe supports are welded thereto in order to securely support the fire tube within the drum. The fire tube may be provided in any convenient size, although good results may be expected when the fire tube diameter is within the range of 20–35%, and preferably about 30%, of the diameter of the drum. As shown in FIG. 1, fire tube 44, like drum 16, has an upper end 52 and a lower end 54. An inlet 56 is provided for combustion products at its lower end, and an outlet 58 is provided for combustion products at its upper end.

The interior of the drum also preferably includes a plurality of flights 60 of conventional design for causing the soil or other particulate material to be lifted and cascaded throughout the interior of the drum generally from upper end 22 to lower end 24 as the drum is rotated about its axis. These flights are preferably made from low alloy steel and are welded or otherwise attached by any convenient means to the interior surface of drum 16.

Apparatus 10 also includes a combustion chamber 62 that is located at the lower end of the drum. Preferably, this chamber is refractory-lined and equipped with a conventional oil or gas burner 64. The combustion chamber is also provided with an air inlet 66, which is preferably in communication with fan 68, which is used to supply air to the combustion chamber. The chamber is also provided with a fuel inlet 70 for supply of fuel to burner 64. Such fuel may be natural gas, oil or any other convenient fuel that is capable of being vaporized and ignited. Combustion chamber 62 is also provided with an outlet 72 for combustion products, which outlet is in fluid communication with the fire tube inlet 56.

In the operation of apparatus 10, fuel from a suitable source is fed through fuel inlet 70 and burned at burner 64 in combustion chamber 62, while ambient air, supplied by operation of fan 68, is introduced through inlet 66 to the chamber. The fuel is supplied to the burner and the air is admitted to the chamber in such quantities that the fuel may be burned in the combustion chamber with an excess of air so as to cool the products of combustion produced thereby to a first temperature that is sufficient to volatilize the contaminants in the particulate material without incineration thereof. Preferably, therefore, when the apparatus is used to treat soil that has been contaminated by petroleum products, the first temperature will be within the range of about 927° C. (1700° F.) to about 1038° C. (1900° F.).

Contaminated soil or other particulate material is then fed into inlet 34 of the drum at a controlled feed rate, and as the drum rotates, the soil cascades through the interior of the drum from upper end 22 to lower end 24. The products of combustion from the combustion chamber are conducted through fire tube 44, and as the soil cascades through the drum, heat is transferred from the fire tube to the soil in the drum by radiation. This transfer of heat to the soil in the drum, which is accomplished without any direct contact between the products of combustion and the contaminated soil, will reduce the temperature of the combustion products at outlet 58 from fire tube 44 to a second temperature that is lower than the first temperature. Preferably, when the apparatus is used to treat soil that has been contaminated by petroleum products, this second temperature will be within the range of about 483° C. (900° F.) to about 649° C. (1200° F.).

The partially cooled combustion products from outlet 58 of fire tube 44 are then preferably conveyed through conduit 74 (illustrated schematically in FIG. 1) to a heat exchanger that is adapted to extract heat from the combustion products. This extraction of heat cools the combustion products to a third temperature that is below the second temperature, in order that the products of combustion may be cooled to a temperature suitable for exhaustion to the atmosphere.

Preferably, when the apparatus is used to treat soil that has been contaminated by petroleum products, this third temperature will be within the range of about 94° C. (200° F.) to about 149° C. (300° F.). As shown in FIG. 1, this heat exchanger may be a tubular heat exchanger of conventional design, such as is illustrated schematically at 76. Tubular heat exchanger 76 is provided with ambient air inlet 78 through which air may be admitted to cool the combustion products. If precooling of the combustion products is desired, damper 80 may be operated to admit tempering air at ambient temperature to conduit 74 at inlet 82, for mixing with the combustion products after they have exited from the outlet of the fire tube and before heat is extracted therefrom by the heat exchanger. The combustion products which pass from the fire tube outlet 58 to the tubular heat exchanger are preferably pulled through the heat exchanger and through line 84 by an induced draft fan 86. Such cooled combustion products, which are not contaminated by any petroleum or other contaminants from the soil, may be then safely be exhausted to the atmosphere through line 88 by operation of damper 90.

Apparatus 10 also includes means for admitting heated air to the air inlet 38 of the drum, so that such heated air may contact the particulate material in the drum as it is conveyed under the influence of gravity and the rotation of the drum to lower end 24. Preferably, the heat exchanger will be employed as a source of heat for this heated air. Thus, heat exchanger 76 may be used to extract heat from the products of combustion and to transfer the heat so extracted to air that is subsequently introduced to the air inlet 38 of the drum through line 92. As shown in FIGS. 1 and 2, the heated air from heat exchanger 76 enters inlet 38 of annular manifold 40, which is arranged around the exterior of drum 16 and supported in a stationary (non-rotating) fashion by supports 94. As so configured, drum 16 will rotate about axis 20 within manifold 40. Preferably, the manifold is provided with sidewalls (not shown) having flexible skirting in order to maintain at least a partial seal between the interior of the manifold and the exterior of the drum as the drum is rotated. Holes 96 provided through the exterior of the drum, as shown in FIG. 2, permit the heated air to flow from manifold 40 into the drum. Once in the drum, the heated air will flow towards the elevated end 22 of the drum.

Preferably, the heated air is introduced to air inlet 38 of the drum at a temperature of about 483°(900° F.) to about 538° C. (1000° F.). If desired in order to control the temperature of this air, a source of air at ambient temperature may be provided for mixing with the air that is heated by the heat exchanger prior to its admission to the air inlet of the drum. Such source of ambient air may be provided to line 92 through line 98, as controlled by damper 100.

The air flow, the rotation of the drum and the elevation of the drum all contribute to the soil's being lifted, showered and tumbled through the hot air stream. The heated air flows counter to and in direct contact with the particulate material cascading through the drum under the influence of gravity and the rotation of the drum. This counter-flow air will contribute to heating of the particulate material in the drum by conduction, so that the contaminants in the particulate material in the drum may be vaporized but not incinerated by the radiation from the fire tube and the conduction from the heated air. Such heated air will also entrain the vaporized contaminants from the contaminated material and conduct them to outlet 36 at upper end 22 of the drum.

Apparatus 10 also includes means for conveying the entrained vaporized contaminants from outlet 36 to second stage treatment unit 14, which is adapted to remove the vaporized contaminants from the entraining air. Preferably, the gaseous airstream exiting the drum through outlet 36 will be drawn through conduit 102 by an induced draft fan such as fan 104.

In addition, because the gaseous airstream from outlet 36 will likely contain fine particulate material or dust from the material in the drum, second stage treatment unit 14 will also preferably include cyclone separator 106 that is located upstream from the contaminant removal system of the second stage unit. Such cyclone separator may be of conventional design, wherein the entrained dust particles may be separated from the gaseous airstream. It is preferred that this dust be returned to the drum at its lower end 24, where it may be mixed with the hot, clean particulate material that has cascaded down the drum. The heat from this clean particulate will vaporize any contaminants that may remain in the dust from the cyclone, and such vaporized contaminants will then be removed from the drum through outlet 36 at the upper end 22. The gaseous airstream containing entrained vaporized contaminants and clean dust will be conveyed through conduit 102 from drum outlet 36 to the separator 106, which is preferably located near the lower end of the drum. In the separator, the dust will settle into collector funnel 108, from which it may be withdrawn through a suitable air lock 110 to discharge pipe 112 which conveys the dust (by gravity feed) back to the drum.

The second stage treatment unit also preferably includes a baghouse that may be located between the cyclone separator and the contaminant removal system (as shown in FIG. 1), or beyond the contaminant removal system (not shown). As shown in FIG. 1, the gaseous airstream from cyclone separator 106 is drawn by fan 104 through gas outlet 114 of the separator and line 116 to baghouse 118. Fine dust that is not collected by the cyclone separator is collected in the baghouse. If the baghouse is located between the cyclone and the contaminant removal system, the dust collected therein can subsequently be removed and combined with the cleaned soil that is discharged from outlet 42. If the baghouse is located beyond the contaminant removal system, the dust collected therein can be removed from the baghouse and combined with the contaminated soil that is admitted at the upper end 22 of the drum, or it may be admitted at any other convenient location (not shown) for treatment within the drum.

The second stage treatment unit also includes a contaminant removal system for removal of the vaporized contaminants from the gas stream from outlet 36. As shown in FIG. 1, the gaseous airstream from baghouse 118 is drawn by fan 104 through conduit 120 to removal system 122, through which the vaporized contaminants entrained in air are conducted to remove the contaminants therefrom. Preferably, this system is selected from the group consisting of carbon beds and hydrocarbon condensers. If carbon beds of conventional design are employed, the vaporized contaminants will be removed therein by absorption in a carbon bed. If hydrocarbon condensers of conventional design are employed, the vaporized contaminants will be removed by condensation therein. The cleaned airstream from the contaminant removal system may then be drawn by fan 104 through conduits 124 and 126, as controlled by valve 128, for discharge to the atmosphere.

After collection of the cleaned soil or other particulate material at discharge point 42, water may be added to cool it, if desired, and the soil may be used on site or may be trucked away for use elsewhere. The soil will be essentially free of contaminants but will not be sterile or otherwise unsuitable for further use.

Although this description contains many specifics, these should not be construed as limiting the scope of the invention but as merely providing illustrations of some of the presently preferred embodiments thereof, as well as the best mode contemplated by the inventor of carrying out the invention. The invention, as described herein, is susceptible to various modifications and adaptations, and the same are intended to be comprehended within the meaning and range of equivalents of the appended claims.

What is claimed is:

1. A method for treating contaminated particulate material to remove the contaminants therefrom, which method comprises:

(a) providing a generally cylindrical, hollow, inclined drum having an upper end and a lower end, which drum is adapted to be rotated about its axis, said drum having:
      (i) an inlet for contaminated particulate material at its upper end;
      (ii) an outlet at its upper end for vaporized contaminants from the particulate material which are entrained in air;
      (iii) an inlet for air that is located between the upper end and the lower end; and
      (iv) an outlet for clean particulate material at its lower end;
   (b) providing a generally cylindrical fire tube within the drum, said fire tube having an axis that is generally parallel to the axis of the drum, and
      (i) an upper end;
      (ii) a lower end;
      (iii) an inlet for combustion products at its lower end; and
      (iv) an outlet for combustion products at its upper end;
   (c) providing a combustion chamber that is located at the lower end of the drum, said combustion chamber having an air inlet, a fuel burner and means for admitting fuel to the burner, and an outlet for combustion products, which outlet is in fluid communication with the fire tube inlet;
   (d) providing a second stage treatment unit that is in fluid communication with the outlet at the upper end of the drum, which second stage treatment unit is adapted to remove vaporized contaminants from a stream of entraining air;
   (e) admitting fuel to the burner and ambient air to the combustion chamber in such quantities that the fuel may be burned in the combustion chamber with an excess of air so as to cool the products of combustion produced thereby to a first temperature that is sufficient to volatilize the contaminants in the particulate material without incineration thereof; while
   (f) rotating the drum about its axis as contaminated particulate material is admitted to the drum at the upper end thereof; and
   (g) conducting the products of combustion from the combustion chamber through the fire tube, so that heat is transferred from the tube to the particulate material in the drum by radiation, and so that the temperature of the combustion products at the outlet from the fire tube will be at a second temperature that is lower than the first temperature; and
   (h) introducing heated air to the air inlet of the drum so that said heated air may contact the particulate material in the drum as it is conveyed under the influence of gravity and the rotation of the drum to the lower end thereof, said air contributing to heating of the particulate material in the drum by conduction and convection, so that the contaminants in the particulate material are vaporized but not incinerated by the radiation from the fire tube and the conduction and convection from the heated air and such air entrains the vaporized contaminants and conducts them to the outlet at the upper end of the drum; and
   (i) discharging clean particulate material from the drum at the lower end thereof; and
   (j) removing vaporized contaminants entrained in air from the drum at the outlet at the upper end thereof and conveying them to the second stage treatment unit; and
   (k) providing a contaminant removal system in the second stage treatment unit, which system is selected from the group consisting of carbon beds and hydrocarbon condensers; and
   (l) conducting the vaporized contaminants entrained in air through the contaminant removal system to remove the contaminants therefrom.

2. The method of claim 1, which includes rotating the fire tube with the drum about the axis of the drum.

3. The method of claim 1, which is carried out so that the first temperature is within the range of about 1700° F. to about 1900° F.

4. The method of claim 1, which is carried out so that the second temperature is within the range of about 900° F. to about 1200° F.

5. The method of claim 1, which is carried out so that the heated air is introduced to the air inlet of the drum at a temperature of about 900°–1000° F.

6. The method of claim 1, which includes providing a heat exchanger that is adapted to:
   (a) extract heat from the combustion products after such products exit from the outlet of the fire tube, so that such combustion products are cooled to a third temperature that is below the second temperature; and
   (b) transfer the heat extracted from the combustion products to air that is subsequently introduced to the air inlet of the drum.

7. The method of claim 6, which includes mixing air at ambient temperature with the combustion products after they have exited from the outlet of the fire tube and before heat is extracted therefrom by the heat exchanger.

8. The method of claim 6, which includes mixing air at ambient temperature with the air that is heated by the heat exchanger prior to its admission to the air inlet of the drum.

9. The method of claim 6, which is carried out so that the third temperature is within the range of about 200° to about 300° F.

10. The method of claim 1, wherein the entraining air removed from the drum at the upper end thereof contains particulate material dust, and wherein the second stage treatment unit includes a cyclone separator that is located upstream from the contaminant removal system and to which the entraining air is communicated from the outlet at the upper end of the drum for removal of the dust therefrom.

11. The method of claim 10, which includes providing a baghouse between the cyclone separator and the contaminant removal system.

12. An apparatus for treating contaminated particulate material to remove the contaminants therefrom, which apparatus comprises:

(a) a generally cylindrical, hollow, inclined drum having an upper end and a lower end, which drum is adapted to be rotated about its axis, said drum having:

(i) an inlet for contaminated particulate material at its upper end;
(ii) an outlet at its upper end for vaporized contaminants from the particulate material which are entrained in air;
(iii) an inlet for air that is located between the upper end and the lower end; and
(iv) an outlet for clean particulate material at its lower end;

(b) a generally cylindrical fire tube within the drum, said fire tube having an axis that is generally parallel to the axis of the drum, and
(i) an upper end;
(ii) a lower end;
(iii) an inlet for combustion products at its lower end; and
(iv) an outlet for combustion products at its upper end;

(c) a combustion chamber that is located at the lower end of the drum, said combustion chamber having an air inlet, a fuel burner and means for admitting fuel to the burner, and an outlet for combustion products, which outlet is in fluid communication with the fire tube inlet;

(d) a second stage treatment unit that is in fluid communication with the outlet at the upper end of the drum, which second stage treatment unit is adapted to remove vaporized contaminants from a stream of entraining air;

(e) means for rotating the drum about its axis;

(f) means for admitting heated air to the air inlet of the drum;

(g) means for removing vaporized contaminants entrained in air from the outlet at the upper end of the drum, and for conveying such entrained contaminants to the second stage treatment unit;

whereby:

(h) fuel is admitted to the burner and ambient air is admitted to the combustion chamber in such quantities that the fuel may be burned in the chamber with an excess of air so as to cool the products of combustion produced thereby to a first temperature that is sufficient to volatilize the contaminants in the particulate material without incineration thereof; and (i) the drum may be rotated about its axis as contaminated particulate material is admitted at the upper end thereof; and (j) the products of combustion from the combustion chamber are conducted through the fire tube, and heat is transferred from the tube to the particulate material in the drum by radiation so that the temperature of the combustion products at the outlet from the fire tube will be at a second temperature that is lower than the first temperature; and (k) heated air may be introduced to the air inlet of the drum so that said heated air may contact the particulate material in the drum as it is conveyed under the influence of gravity and the rotation of the drum to the lower end thereof, said air contributing to heating of the particulate material in the drum by conduction and convection, so that the contaminants in the particulate material are vaporized but not incinerated by the radiation from the fire tube and the conduction and convection from the heated air, and such air entrains the vaporized contaminants and conducts them to the outlet at the upper end of the drum; and (l) clean particulate material is discharged from the drum at the lower end thereof; and (m) vaporized contaminants entrained in air are removed from the drum at the outlet at the upper end thereof and conveyed to the second stage treatment unit, where such contaminants are removed from the entraining air.

13. The apparatus of claim 12, wherein the drum is thermally insulated.

14. The apparatus of claim 12, wherein the diameter of the fire tube is within the range of 20–35% of the diameter of the drum.

15. The apparatus of claim 12, wherein the axis of the fire tube is substantially coincident with the axis of the drum.

16. The apparatus of claim 12, wherein the fire tube is adapted to be rotated with the drum about the axis of the drum.

17. The apparatus of claim 12, wherein the contaminated particulate material is soil that has been contaminated with petroleum products.

18. The apparatus of claim 12, which includes a heat exchanger that is adapted to:
(a) extract heat from the combustion products after such products exit from the outlet of the fire tube, so that such combustion products are cooled to a third temperature that is below the second temperature; and
(b) transfer the heat extracted from the combustion products to air that is subsequently introduced to the air inlet of the drum.

19. The apparatus of claim 18, wherein a source of air at ambient temperature is provided for mixing with the combustion products after they have exited the outlet of the fire tube and before heat is extracted therefrom by the heat exchanger.

20. The apparatus of claim 18 wherein a source of air at ambient temperature is provided for mixing with the air that is heated by the heat exchanger prior to its admission to the air inlet of the drum.

21. The apparatus of claim 12, wherein the second stage treatment unit includes a contaminant removal system selected from the group consisting of carbon beds and hydrocarbon condensers, through which the vaporized contaminants entrained in air are conducted to remove the contaminants therefrom.

22. The apparatus of claim 21, wherein the entraining air removed from the drum at the upper end thereof contains particulate material dust, and wherein the second stage treatment unit includes a cyclone separator that is located upstream from the contaminant removal system and to which the entraining air is conveyed from the outlet at the upper end of the drum for removal of the dust therefrom.

23. The apparatus of claim 22, which includes a baghouse that is located between the cyclone separator and the contaminant removal system.

24. In a method for treating contaminated particulate material to remove the contaminants therefrom, the improvement which comprises vaporizing the contaminants to remove them from the material by:
(a) providing a generally cylindrical, hollow, inclined drum having an upper end and a lower end, which drum is adapted to be rotated about its axis, said drum having:
(i) an inlet for contaminated particulate material at its upper end;
(ii) an outlet at its upper end for vaporized contaminants from the particulate material which are entrained in air;
(iii) an inlet for air that is located between the upper end and the lower end; and
(iv) an outlet for clean particulate material at its lower end;

(b) providing a generally cylindrical fire tube within the drum, said fire tube having an axis that is generally parallel to the axis of the drum, and
   (i) an upper end;
   (ii) a lower end;
   (iii) an inlet for combustion products at its lower end; and
   (iv) an outlet for combustion products at its upper end;
(c) providing a combustion chamber that is located at the lower end of the drum, said combustion chamber having an air inlet, a fuel burner and means for admitting fuel to the burner, and an outlet for combustion products, which outlet is in fluid communications with the fire tube inlet;
(d) admitting fuel to the burner and ambient air to the combustion chamber in such quantities that the fuel may be burned in the combustion chamber with an excess of air so as to cool the products of combustion produced thereby to a first temperature that is sufficient to vitalize the contaminants in the particulate material without incineration thereof; while
(e) rotating the drum about its axis as contaminated particulate material is admitted to the drum at the upper end thereof; and
(f) conducting the products of combustion from the combustion chamber through the fire tube, so that the heat is transferred from the tube to the particulate material in the drum by radiation, and so that the temperature of the combustion products at the outlet for the fire tube will be at a second temperature that is lower than the first temperature; and
(g) introducing heated air to the air inlet of the drum so that said heated air may contact the particulate material in the serum as it is conveyed under the influence of gravity and the rotation of the drum to the lower end thereof, said air contributing to heating of the particulate material in the drum by conduction and convection, so that the contaminants in the particulate material are vaporized but not incinerated by the radiation from the fire tube and the conduction and convection from the heated air and such air entrains the vaporized contaminantes and conducts them to the outlet at the upper and of the drum; and
(h) descharging clean particulate material from the rum at the lower end thereof; and
(i) removing vaporized contaminants entrained in air from the drum at the outlet at the upper end thereof.

\* \* \* \* \*

UNITED STATES PATENT AND TRADEMARK OFFICE
CERTIFICATE OF CORRECTION

PATENT NO : 5,904,904

DATED : May 18, 1999

INVENTOR(S): Malcolm Leland Swanson

It is certified that error appears in the above-identified patent and that said Letters Patent is hereby corrected as shown below:

At column 13, line 20 (line 6 of part (d) of claim 24), delete "vitalize" and substitute therefor -- volatilize --.

At column 14, line 10 (line 3 of part (g) of claim 24), delete "serum" and substitute therefor -- drum --.

At column 14, line 18 (line 11 of part (g) of claim 24), delete "and" (second occurrence) and substitute therefor -- end --.

At column 14, line 20 (line 1 of part (h) of claim 24), delete "rum" and substitute therefor -- drum --.

Signed and Sealed this

Thirty-first Day of August, 1999

*Attest:*

Q. TODD DICKINSON

*Attesting Officer*    *Acting Commissioner of Patents and Trademarks*